(12) United States Patent
Gervais et al.

(10) Patent No.: US 6,617,367 B1
(45) Date of Patent: Sep. 9, 2003

(54) INTERNALLY GENERATED ROTOR SET FOR LOW VISCOSITY AND ABRASIVE METERING APPLICATIONS

(75) Inventors: Edward H. Gervais, North Yarmouth, ME (US); Souheil Eldanaf, Oakville, CT (US)

(73) Assignee: Sealed Air Corporation, Saddle Brook, NJ (US)

( * ) Notice: Subject to any disclaimer, the term of this patent is extended or adjusted under 35 U.S.C. 154(b) by 0 days.

(21) Appl. No.: 09/666,041

(22) Filed: Sep. 20, 2000

Related U.S. Application Data

(60) Provisional application No. 60/154,847, filed on Sep. 20, 1999.

(51) Int. Cl.⁷ .............................................. C08G 18/00
(52) U.S. Cl. ...................... 521/155; 521/170; 521/174; 264/45.8; 264/45.9; 264/46.2; 264/51; 264/54; 264/165
(58) Field of Search .................................. 521/170, 174, 521/155; 264/45.8, 45.9, 46.2, 51, 54, 165

(56) References Cited

U.S. PATENT DOCUMENTS

| | | |
|---|---|---|
| 3,584,986 A | 6/1971 | Hansen et al. |
| 3,623,829 A | 11/1971 | Shaw et al. |
| 3,907,465 A | 9/1975 | Dorff et al. |
| 4,413,960 A | 11/1983 | Specht |
| 4,420,292 A | 12/1983 | Lutz |
| 4,504,202 A | 3/1985 | Saegusa |
| 4,714,417 A | 12/1987 | Wankel |
| 5,066,207 A | 11/1991 | Valavaara |
| 5,466,137 A | 11/1995 | Bierlein et al. |
| 5,521,224 A | 5/1996 | Sulzbach et al. |
| 5,658,138 A | 8/1997 | Round et al. |
| 5,720,251 A | 2/1998 | Round et al. |

FOREIGN PATENT DOCUMENTS

EP     0 686 467 A     12/1995

*Primary Examiner*—John M. Cooney, Jr.
(74) *Attorney, Agent, or Firm*—Finnegan, Henderson, Farabow, Garrett & Dunner LLP

(57) ABSTRACT

An internal gear set comprising an inner rotor having a number of radially projecting cylindrical tooth members engaging a conjugate internally toothed outer rotor. The latter has one more tooth than there are tooth members on the inner rotor and is mounted eccentrically to the inner rotor so that the rotors move conjugately relative to one other.

13 Claims, 3 Drawing Sheets

INTERNALLY GENERATED ROTOR SET FOR LOW VISCOSITY AND ABRASIVE METERING APPLICATIONS

Applicants claim the right to priority based on Provisional Patent Application No. 60/154,847 filed Sep. 20, 1999.

FIELD OF THE INVENTION

The invention relates to pumps, and in particular to a rotary pump having inner and outer rotors, wherein the inner rotor drives the outer rotor. Further, the invention relates to a rotary pump having inner and outer rotors for use in low viscosity and abrasive metering applications.

BACKGROUND OF THE INVENTION

Rotary pumps having pumping elements consisting of a driving inner rotor and a driven outer rotor are generally referred to as internal gear pumps. A particular class of internal rotary gear pumps commonly known as internal gerotor pumps are often used in chemical metering applications, for example, when pumping the components of two-part polyurethane foam.

Gerotor type pumping elements are characterized by an inner member having one less tooth than the outer member and by the fact that each tooth of one member is always in contact with some portion of the other member. This interaction between the members results in continuous driving contact, and when the gears are rotated, a series of expanding and contracting chambers are formed which, when connected with appropriate passages, provides pumping action. In the case of the conventional externally generated gerotor, the outer member has a series of inwardly protruding circular teeth such that the set has the aforementioned properties.

The limitations of this approach are apparent in the foam-in-place packaging industry where two-part polyurethane is used to make the packaging materials. The two-part polyurethane foam packaging material is based upon the reaction of two precurser components, which when mixed will react to form a polymer foam and gaseous by-products. In particular, and most commonly, an isocyanate containing component is mixed with a polyol containing component and these components react to produce a urethane polymer (polyurethane), steam, and carbon dioxide.

As the two-part polyurethane foam requirements have become more specialized in the foam-in-place industry, the constituent parts, i.e., the isocyanate containing component and the polyol containing component, have become more abrasive and less viscous. Because of the inherent sliding action in a conventional externally generated gerotor set, pump life in this particular application has been reduced from over 1000 hours to about 100–200 hours.

A lesser known form of the conventional gerotor is the IGR or Internally Generated Rotor Set. In this device, the inner rotor has a number of circular externally protruding teeth and the outer rotor is internally generated such that it has the same characteristics as an externally generated rotor set, i.e., an inner member having one less tooth than the outer and where each tooth of one member is always in contact with some portion of the other member, thus resulting in continuous driving contact. In this case, however, the circular teeth of the inner member can be replaced by rolls which are contained in recesses in the inner member, which recesses are of substantially the same diameter as the rolls. Properly designed, this allows the rolls to operate hydrodynamically within the recesses. Further, the combination of both centrifugal and pressure forces drive the roll into intimate rolling contact with the outer member, thus providing fluid tight sealing as well as the elimination of the sliding contact that has led to the reduction in pump life in conventional gerotor pumps as the pumped chemicals have become more abrasive and less viscous. It should be noted that because of the pressure loading of the rolls, the IGR will accommodate a certain amount of tooth wear without a loss in pumping performance. An example of an internally generated rotor set is disclosed in U.S. Pat. No. 3,623,829.

Rotary pumps using internally generated rotor sets of the foregoing types are characterized by the fact that the lobe outline of the inner rotor is centered on an axis spaced from and parallel to the axis on which the recess outline of the outer rotor is centered, this spacing being termed the "eccentricity." One cycle is defined as the rotation required for the inner rotor to advance one lobe in relation to the outer rotor, and the total volumetric expansion (or contraction) of the spaces between gear lobes of a specified thickness in one cycle is termed the "displacement" of the rotor set. Internally generated rotor sets are not known to have been previously used in chemical metering applications.

In a practical device using an internally generated rotor set of the foregoing type, there are a number of ways of supporting the rotors. Both rotors may be rotated about fixed axes, or either of the rotors may be held fixed while the other rotor is rotated and orbited in relation to it. As between these alternatives the choice is determined to some extent by end use considerations. In a chemical metering application it is generally desired that rotors rotate about fixed axes.

SUMMARY OF THE INVENTION

As embodied and broadly described herein, the invention is a rotary fluid displacement device for pumping low viscosity or abrasive fluids such as are currently used in the two-part polyurethane foam industry, comprising a pump housing having a fluid inlet port and a fluid outlet port, and an internally generated rotor set located within the pump housing. The internally generated rotor set further comprises an inner rotor including a support having a predetermined number of fragmental cylindrical recesses equally spaced about its periphery and a rigid cylindrical tooth rotor received in each recess in rotational sliding contact therewith. Each tooth member has substantially the same diameter as the corresponding recess and a portion of each tooth member is projecting from the periphery. An internally toothed outer rotor is formed as the conjugate of the inner rotor, and is in simultaneous rolling engagement with all of the tooth members. Moreover, the outer rotor has a number of teeth one greater than that of the inner rotor.

BRIEF DESCRIPTION OF THE DRAWINGS

The accompanying drawings, which are incorporated herein and constitute a part of this specification, illustrate an embodiment of the invention, and, together with the description, serve to explain the principles of the invention.

DESCRIPTION OF THE PREFERRED EMBODIMENTS

Reference will now be made in detail to the present preferred embodiments of the invention, an example of which is illustrated in the accompanying drawings.

In accordance with the invention, the rotary pump has an inner rotor and an outer rotor, with the inner rotor being located within the outer rotor.

Figure 1:
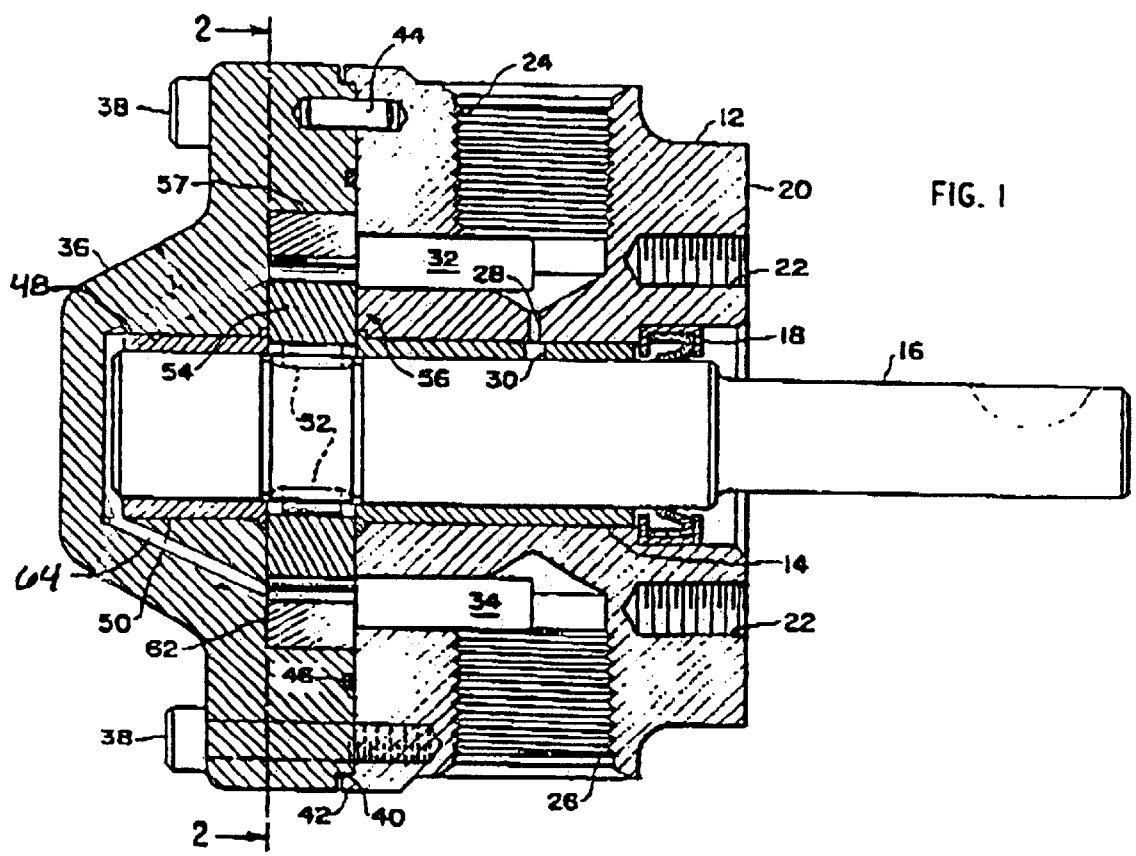
FIG. 1 is a longitudinal elevation in section on a plane through the central axis of a rotary pump having an internal gear set embodying the invention.

As shown in FIG. 1, the pump has a mounting plate 12 of annular shape with a central bore in which a bearing 14 is fitted to receive a drive shaft 16. A seal 18 of a suitable type is received in an annular enlargement of the bore at one end of the sleeve bearing. The plate 12 also has a flat mounting surface 20 and tapped holes 22 for mounting the pump on a suitable support.

Two blind diametral holes are drilled and tapped in the plate 12 to define an outlet port 24 and an inlet port 26. These ports respectively receive the pressure and suction lines of the pump. The outlet port 24 preferably communicates with a hole 28 that is aligned with a hole 30 in the sleeve bearing 14 that permits the fluid to enter the clearances between the bearing 14 and the shaft 16, thus providing lubrication between the two.

Figure 2:
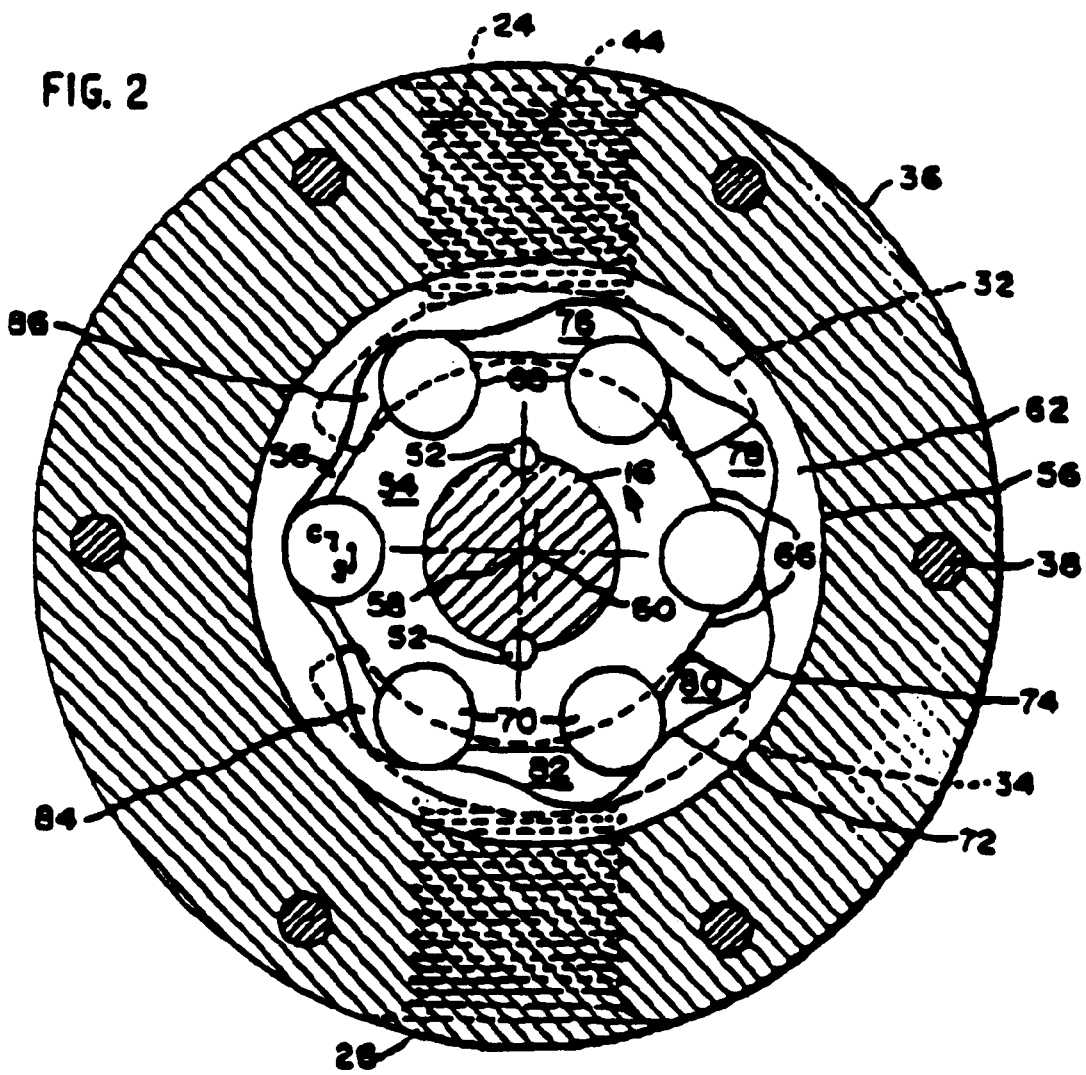
FIG. 2 is a transverse elevation in section taken on line 2—2 of FIG. 1 showing the construction of the novel internal gear set.

Each of the ports 24 and 26 communicates with one face of the plate 12 through an arcuate kidney-shaped aperture or port 32 or 34, respectively, the outlines of these ports being shown by broken lines in FIG. 2.

A housing 36 is bolted on the plate 12 by bolts 38. To ensure accuracy of positioning transversely to the shaft axis, the housing has an accurately machined annular shoulder 40 fitting within a flange 42 formed by an accurate counterbore on the mating face of the plate. To ensure accuracy of positioning angularly about the shaft axis the housing and plate have holes to receive the ends of a locating pin 44. A circular O-ring seal 46 is also provided between the housing and plate.

The housing has an accurate blind central bore 48 concentric with the shaft axis. In this bore a sleeve bearing 50 is fitted to receive the shaft 16. The shaft, which has its axis fixed in relation to the support on which the pump is mounted, receives and is keyed by means of cylindrical keys 52 to a support member 54 forming a part of an inner gear 56.

The housing 36 has a counterbore 57 machined eccentrically to the axis of the shaft 16. In FIG. 2 the axis of the shaft is shown at 58 and that of the counterbore 57 is shown at 60. Within this counterbore is fitted an outer rotor or internally generated rotor 62. A vent 64 is drilled diagonally through the housing 36 from a point on the end of the counterbore inward of the outer rotor 62, to the root of the bore 48, and serves to prevent pressure loading of the shaft.

Figure 3:
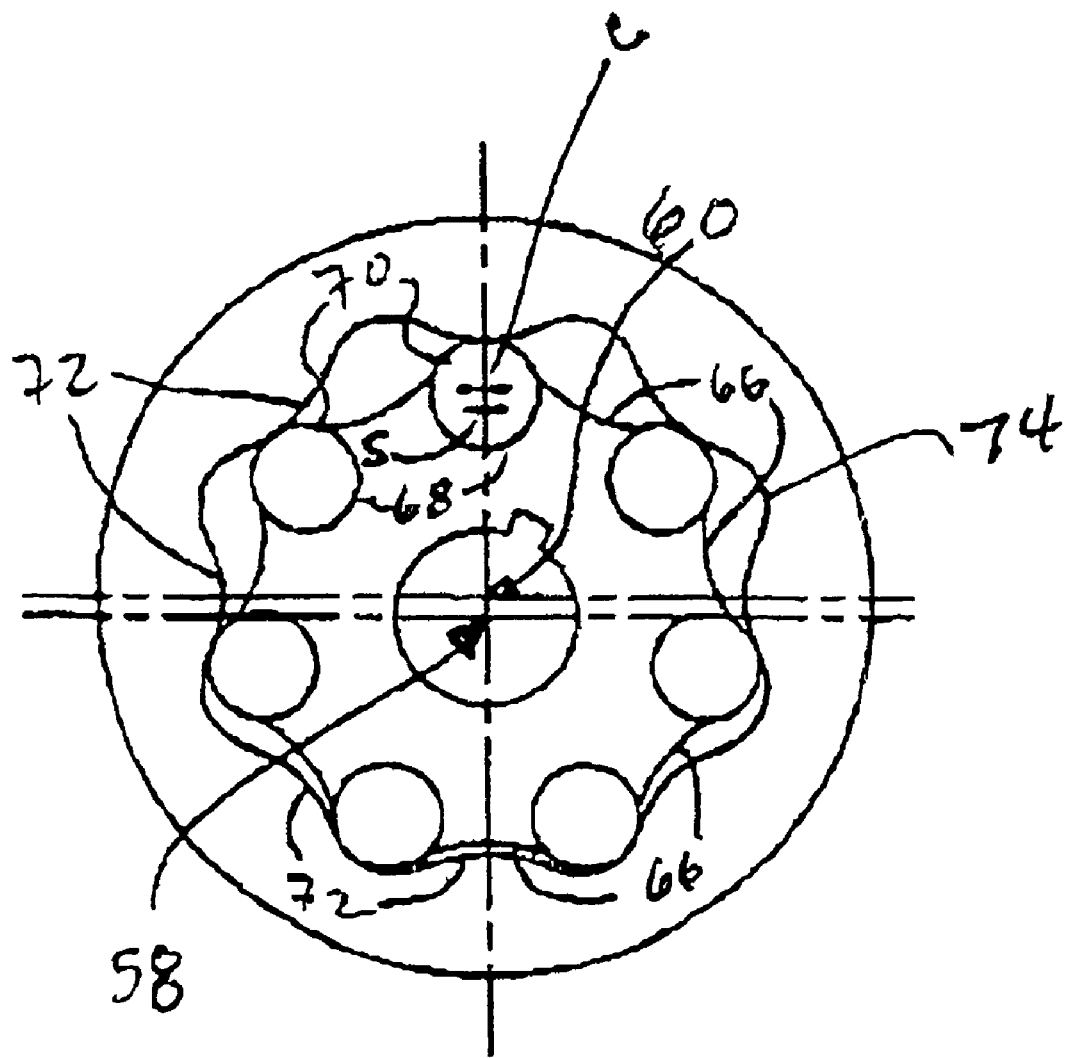
FIG. 3 is a transverse elevation of an inner and outer rotor set of this invention.

The inner and outer rotors are shown in further detail in FIG. 3 and are constructed as follows. Each of the rotors is formed from flat plate stock having precisely parallel surfaces. The inner rotor is formed by machining a number of parallel holes of equal diameter equally spaced radially from and angularly about the axis 58. In a preferred embodiment, there are seven 0.1875 inch diameter holes on a 0.396 inch pitch circle. The edges of the plate are then cut to produce surfaces 66 intersecting the machines holes, leaving fragmental cylindrical recesses or pockets 68 defining the roll spaces of the inner rotor and opening through the outer periphery thereof. Solid metal cylindrical tooth members or lobes 70 are slidably received, preferably with a slip fit in the recesses or pockets 68. These lobes 70 have substantially the same diameter as the holes from which the recesses 68 are formed. The length of the tooth members or lobes 70 is substantially equal to the inner rotor thickness. Thus, the lobes 70 project radially beyond the openings through the outer periphery of the inner rotor to provide the teeth 72 for the inner rotor.

The outer rotor 62 is formed on a standard Fellows gear shaper or any other known machine for producing the desired shape, thereby producing teeth 72 and spaces 74. The number of teeth 72 is one greater than the number of cylindrical tooth members or lobes 70 on the inner rotor which in the case of the preferred embodiment is seven. The form of the teeth 72 and spaces 74 is thereby generated as the conjugate of the inner rotor.

The outer rotor shaping operations may be understood by considering parts of FIG. 2 as a plan view of a commercially available Fellows gear shaper, wherein the part 36 represents the horizontal bed of the machine rotating about a fixed axis represented by 60 in the drawing, and the part 62 represents the workpiece which is initially a blank ring mounted on the bed so as to be rotatable about its own axis, this axis being coincident with the axis 60. One of the lobes 70 in the figure may be considered as representing a circular metal cutting tool having an axis c and a diameter equal to one of the lobes 70. The cutting tool is mounted on the cutter spindle of the gear shaper which has a fixed axis s at right angles to the plane of the sheet. The spindle moves in axial strokes in the manner characteristic of gear shapers. Instead of mounting the circular cutting tool coaxially with its spindle, it is secured to the spindle eccentrically with its axis c spaced from the axis s of the spindle by the eccentricity which is equal to the distance between the axes 58 and 60 in the finished pump. The axis s of the spindle is also spaced from that of the blank (represented by 60) by the pitch radius of the rolls or lobes of the inner rotor. In the case of the preferred embodiment, the eccentricity is 0.035 inches and the pitch radius of the inner rolls is 0.198 inches.

During the rotor cutting operation the axis c rotates at constant speed around the fixed axis s. Also, the blank rotates around its fixed axis 60 at a constant speed synchronized therewith and in the same sense or direction. This is accomplished by suitable adjustment of the gear train on the shaper between the cutter spindle and the bed. It will be seen that one tooth of the outer rotor blank is formed in each revolution of the axis c, and therefore the gearing is such that in one complete revolution of the blank there are as many revolutions of the axis c as there are teeth to be cut in the outer gear, namely, one more than the number of lobes in the inner rotor 56.

Therefore, it will be evident that in operation of the pump, every tooth member or lobe 70 of the inner rotor will theoretically remain continuously in contact with the surface of the outer gear, thereby creating as many expansible and contractable interstitial spaces or chambers as there are lobes on the inner rotor. In FIG. 2 these chambers are designated 76, 78, 80, 82, 84 and 86. If the shaft 16 is rotated in the direction of the arrow, the outer rotor 62 is constrained to rotate about the axis 60 at a somewhat lower velocity which bears the same ratio to that of the shaft as the number of tooth members on the inner gear bears to the number of teeth on the outer gear. The chambers therefore progress counterclockwise as viewed in FIG. 2. It will be seen that the chambers in communication with the aperture or port 32 are contracting in volume, while those in communication with the aperture or port 34 are expanding. Therefore, the device pumps fluid from the suction port 26 to the pressure port 24, each chamber progressing through a complete cycle of expansion and contraction in one revolution of the shaft. The total volume displaced by one chamber per cycle, times the number of chambers, equals the theoretical pump displacement per cycle.

The rotor set herein described is characterized by rolling action of the individual tooth members or lobes 70 on the internally generated surface of the outer rotor 62, as contrasted to sliding action that takes place in many of the commonly used internal gear sets of this general type. This rolling action entails rotational sliding of each tooth member or lobe 70 within its individual recess or pocket 68. Because of this rolling contact, the load capability is greatly increased through the elimination of wear resulting from galling, welding and scoring associated with sliding friction. Because of both centrifugal and pressure forces, the rolls are forced into intimate contact with the outer rotor, thus providing fluid tight sealing and allowing compensation for wear.

Alternative structures of the inner gear may be employed, in addition to which the number and diameter of the lobes. 70 may be chosen to conform to particular operational specifications. Thus the support member 54 may be constructed of various materials and may take various forms consistently with the provision of recesses for the tooth members.

Also, the lobes 70 may be of tubular or sleeve form, that is, of hollow cylindrical form, thereby reducing weight. They may also be in the form of cylinders over which wear sleeves of the same or a different material are fitted. The outer surfaces may be treated to resist wear, particularly when light weight materials such as aluminum are employed.

In a preferred embodiment, the invention is a rotary fluid displacement device for dispensing fluids having low viscosities and/or abrasive properties. The fluids can be the constituent parts of a two-part polyurethane foam, or any other fluid having these properties. In this embodiment, the rotary fluid displacement device has an inlet port and an outlet port, wherein the inlet port is in fluid communication with a container housing a fluid. In addition, the pump has inner and outer rotors. When the pump is activated, the movement of the inner and outer rotors draws the fluid into the pump cavity and forces it out the outlet port. Fluids exhibiting low viscosities and/or abrasive properties are often used when making two-part polyurethane for foam-in-packaging. In a two-part polyurethane foam process, an isocyanate containing component and an polyol containing component are pumped separately through different pumps and are mixed after leaving the pump outlet.

Because of fixed internal clearances, volumetric efficiency on conventional gerotor forms drops rapidly when fluid viscosities are less than 10 centipoise (Cp.). Further, because of the sliding action of these devices, operation with abrasive fluids or slurries will cause rapid and permanent performance deterioration. In the case of the IGR, there is rolling and sealing contact between the rolls and the generated outer rotor surface and hydrodynamic action between the rolls and their respective recesses in the inner rotor. Initial IGR testing on fuels such as kerosene which has a viscosity of about 1.5 Cp. and water, with a viscosity of less than 1 Cp., demonstrated little performance deterioration due to internal leakage. Further, life testing with abrasive fluids has demonstrated that even with as much as 0.010 inches of wear on the rolls, performance was not materially affected. These tests clearly substantiate the compensating ability of the device.

The present invention also includes the method of pumping low viscosity and/or abrasive fluids with a rotary fluid displacement device. In a preferred embodiment, the method comprises the steps of pumping the fluid from a container to the fluid inlet, through the pump motor, and out the fluid outlet. The pumping action is accomplished by using an internally generated rotor set as described above.

The use of an internally generated rotor set in this type of low viscosity and/or abrasive metering application has resulted in substantial improvements as compared to the use of externally generated rotor sets. Due to the low viscosity and increased abrasiveness of the chemicals now being used in making two-part polyurethane foam, the life of rotary pumps having externally generated rotor sets has decreased from about 1,000 hours to about 100–200 hours. This has led to increased costs in equipment maintenance, as well as increased down time for equipment. Preliminary results for rotary pumps using internally generated rotor sets in making two-part polyurethane foam have shown that failure of the rotor set does not occur until the unit has been used for 1000–2000 hours, or more.

In a two-part polyurethane foam making process, the rotor set is considered to be in a state of failure when the efficiency of the pump reaches less than 80%. Efficiency is determined by comparing the actual output flow against the theoretical output flow of the fluid. In an experiment conducted with a pump having an externally generated rotor set (EGR) and a pump having an internally generated rotor set (IGR), where the pumps were pumping fluid from the same drum at the same time, the following data was collected:

| HOURS OPERATED | IGR EFFICIENCY | EGR EFFICIENCY |
| --- | --- | --- |
| 0 | 95 | 92 |
| 238 | 93 | 79 |
| 281 | 93 | 72 |
| 303 | 93 | 66 |
| 542 | 92 | no data |
| 843 | 93 | 60 |
| 998 | 93 | 65 |
| 1889 | 89 | no data |
| 2332 | 89 | no data |

As evidenced by the data, the pump having an internally generated rotor set operated 2,332 hours without failing, i.e., the pump operated with efficiencies greater than 80%. The pump having an externally generated rotor set, on the other hand, failed in less than 238 hours. Thus, in this experiment, the internally generated rotor set had a life of about ten times that of the externally generated rotor set.

It will be apparent to those skilled in the art that various modifications and variations can be made in the present invention and in construction of this invention without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A method of making a two-part polyurethane foam comprising the steps of:

pumping an isocyanate fluid through a first pump;
pumping a polyol fluid through a second pump; and
mixing the isocyanate fluid and polyol fluid after the fluids exit the first and second pumps to form a two-part polyurethane foam, wherein the first and second pumping actions are effectuated by using an internally generated rotor set which comprises in combination:
an inner rotor including a support having a predetermined number of fragmental cylindrical recesses equally spaced about its periphery and a rigid cylindrical tooth member received in each recess in rotational sliding contact therewith, each tooth member having substantially the same diameter as the corresponding recess, a portion of each tooth member projecting from the periphery, and
an internally toothed outer rotor formed as the conjugate of the inner rotor, having simultaneous rolling engagement with all of the tooth members and having a number of teeth one greater than the predetermined number.

2. A method of making a two-part polyurethane foam including:
pumping a first abrasive and/or low viscosity fluid and pumping a second abrasive and/or low viscosity fluid, wherein the first and second low viscosity fluids have a viscosity of less than about 10 centipoise, the first and second fluids capable of combining to form a two-part polyurethane foam, wherein the pumping action is effectuated by using an internally generated rotor set which comprises in combination:
an inner rotor including a support having a predetermined number of fragmental cylindrical recesses equally spaced about its periphery and a rigid cylindrical tooth member received in each recess in rotational sliding contact therewith, each tooth member having substantially the same diameter as the corresponding recess, a portion of each tooth member projecting from the periphery, and
an internally toothed outer rotor formed as the conjugate of the inner rotor, having simultaneous rolling engagement with all of the tooth members and having a number of teeth one greater than the predetermined number.

3. The method according to claim 2, wherein the first and second fluids are mixed after pumping to form the two-part polyurethane foam.

4. The method according to claim 2 wherein either the first or second fluid is an isocyanate.

5. The method according to claim 2 wherein either the first or second fluid is a polyol.

6. A method of making a two-part polyurethane foam comprising the steps of:
pumping a first abrasive and/or low viscosity fluid through a first pump, wherein the low viscosity fluid has a viscosity of less than about 10 centipoise;
pumping a second abrasive and/or low viscosity fluid through a second pump, wherein the low viscosity fluid has a viscosity of not more than about 10 centipoise; and
mixing the first and second fluids after the fluids exit the first and second pumps to form a two-part polyurethane foam,
wherein the first and second pumping actions are effectuated by using an internally generated rotor set which comprises in combination:
an inner rotor including a support having a predetermined number of fragmental cylindrical recesses equally spaced about its periphery and a rigid cylindrical tooth member received in each recess in rotational sliding contact therewith, each tooth member having substantially the same diameter as the corresponding recess, a portion of each tooth member projecting from the periphery, and
an internally toothed outer rotor formed as the conjugate of the inner rotor, having simultaneous rolling engagement with all of the tooth members and having a number of teeth one greater than the predetermined number.

7. The method according to claim 6 wherein either the first or second fluid is an isocyanate.

8. The method according to claim 6 wherein either the first or second fluid is a polyol.

9. A method of making a two-part polyurethane foam including:
pumping a first abrasive and/or low viscosity fluid through a first pump, wherein the low viscosity fluid has a viscosity of less than about 10 centipoise;
pumping a second abrasive and/or low viscosity fluid through a second pump, wherein the low viscosity fluid has a viscosity of less than about 10 centipoise; and
mixing the first and second fluids after the fluids exit the first and second pumps to form a two-part polyurethane foam,
wherein the efficiency of at least the first or second pump is at least 80% for at least about 500 operating hours, and wherein the efficiency of at least the first or second pump is effectuated by using an internally generated rotor set which comprises in combination:
an inner rotor including a support having a predetermined number of fragmental cylindrical recesses equally spaced about its periphery and a rigid cylindrical tooth member received in each recess in rotational sliding contact therewith, each tooth member having substantially the same diameter as the corresponding recess, a portion of each tooth member projecting from the periphery, and
an internally toothed outer rotor formed as the conjugate of the inner rotor, having simultaneous rolling engagement with all of the tooth members and having a number of teeth one greater than the predetermined number.

10. The method according to claim 9 wherein either the first or second fluid is an isocyanate.

11. The method according to claim 9 wherein either the first or second fluid is a polyol.

12. The method according to claim 9 wherein the efficiency of at least the first or second pump is at least 80% for at least about 1000 operating hours.

13. The method according to claim 9 wherein the efficiency of at least the first or second pump is at least 80% for at least about 2000 operating hours.

* * * * *